United States Patent
Marinoiu et al.

(10) Patent No.: US 9,881,032 B2
(45) Date of Patent: Jan. 30, 2018

(54) PERSONAL OBJECTS USING DATA SPECIFICATION LANGUAGE

(71) Applicants: Bogdan Marinoiu, Courbevoie (FR); Jean-Yves Cras, Paris (FR); Rodolphe Boixel, Courbevoie (FR); Didier Bolf, Boulogne-Billancourt (FR)

(72) Inventors: Bogdan Marinoiu, Courbevoie (FR); Jean-Yves Cras, Paris (FR); Rodolphe Boixel, Courbevoie (FR); Didier Bolf, Boulogne-Billancourt (FR)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 614 days.

(21) Appl. No.: 14/304,189

(22) Filed: Jun. 13, 2014

(65) Prior Publication Data
US 2015/0363433 A1 Dec. 17, 2015

(51) Int. Cl.
*G06F 17/30* (2006.01)

(52) U.S. Cl.
CPC .. *G06F 17/30292* (2013.01); *G06F 17/30595* (2013.01)

(58) Field of Classification Search
CPC ........ G06Q 10/063112; G06C 30/0239; G06F 17/30292; G06F 17/30227; G06F 17/30424; G06F 17/30563; G06F 17/30592; G06F 17/30595; G06F 17/30619

USPC .............. 455/466, 418, 550.1; 705/14.1; 707/E17.005, E17.044, 602, 741, 803, 707/809, 999.1; 709/206
See application file for complete search history.

(56) References Cited

U.S. PATENT DOCUMENTS

| | | | |
|---|---|---|---|
| 7,380,236 B2* | 5/2008 | Hawley ................. | G06F 9/4443 717/109 |
| 7,493,330 B2 | 2/2009 | Cubranic | |
| 8,572,122 B2 | 10/2013 | Cras et al. | |
| 2002/0059195 A1 | 5/2002 | Cras et al. | |
| 2004/0064456 A1* | 4/2004 | Fong ................. | G06F 17/30592 |
| 2005/0015360 A1 | 1/2005 | Cras et al. | |
| 2008/0059449 A1 | 3/2008 | Webster et al. | |
| 2008/0104051 A1 | 5/2008 | Gosper | |
| 2009/0112904 A1 | 4/2009 | Cubranic | |
| 2009/0228436 A1 | 9/2009 | Pasumansky et al. | |
| 2010/0287185 A1* | 11/2010 | Cras ................. | G06F 17/30439 707/769 |
| 2011/0295865 A1 | 12/2011 | Carroll et al. | |

* cited by examiner

*Primary Examiner* — Jay Morrison
*Assistant Examiner* — Ken Hoang
(74) *Attorney, Agent, or Firm* — Buckley, Maschoff & Talwalkar LLC

(57) ABSTRACT

A system includes reception of a logical schema associated with data stored in a data store, generation of an input schema based on the logical schema, reception of an expression having a type of the input schema and comprising a first expression element defining an object, compilation of the first expression element based on the input schema to generate an output schema, and merger of the output schema and the input schema to generate a second input schema.

12 Claims, 13 Drawing Sheets

PERSONAL OBJECTS USING DATA SPECIFICATION LANGUAGE

BACKGROUND

Business users require access to corporate data stored in relational databases. In order to facilitate such access, analytics applications map logical entities of a relational database's schema to a set of abstract entities known as business objects. The business objects may represent business entities, such as customers, time periods, financial figures, etc. The mappings and the business objects form a type of semantic layer, known as a Universe, residing between the user and the database. A business user may query the database by referring to the business objects, without referring to the underlying logical entities of the database.

The Data Specification Language, i.e. DaSL, is described in U.S. Pat. No. 8,572,122, the contents of which are incorporated by reference herein for all purposes. DaSL allows a business user to create powerful and flexible queries of an underlying data source.

When asking a business question using DaSL, DaSL leverages an available business model, such as a Universe, to define a dataset which answers the business question. DaSL uses business terms (i.e., DaSL attributes), and handles the business terms and relations between them in a homogeneous way, as attributes and dependencies between attributes. DaSL can also be considered a schema transformation language because compilation of a DaSL expression begins with an input schema extracted from the business model, and results in a data schema which defines the shape of the result dataset.

It is desirable to allow a user to enrich a DaSL schema by adding new attributes (and dependencies between them). This ability could support user creation of Key Performance Indicators and other custom business objects and execution of what-if analysis for Enterprise Performance Management applications. It is also desirable to add new attributes and dependencies between attributes using declarative expressions which are independent of the underlying data source, and to provide sharing of the new attributes and dependencies among users.

DETAILED DESCRIPTION

The following description is provided to enable any person in the art to make and use the described embodiments. Various modifications, however, will remain readily apparent to those in the art.

The foregoing description describes the addition of new attributes and associated dependencies to a DaSL input schema. These new attributes will be referred to herein as personal objects. The personal objects are defined in DaSL using DaSL operators. Contrary to the business objects of the input schema, the personal objects are not stored in a Universe according to some embodiments.

Figure 1:
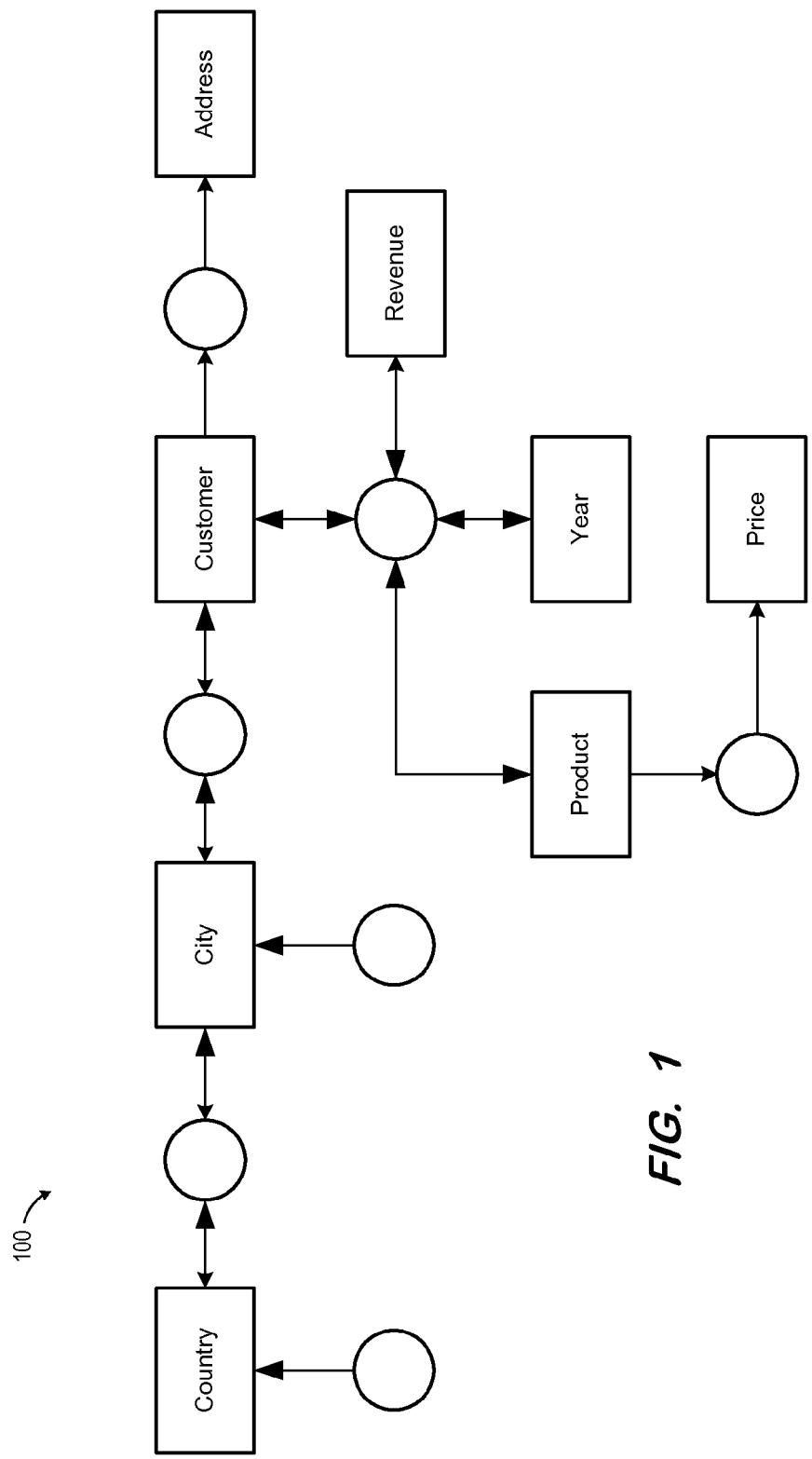
FIG. 1 is a diagram of an input schema according to some embodiments.
Figure 2:
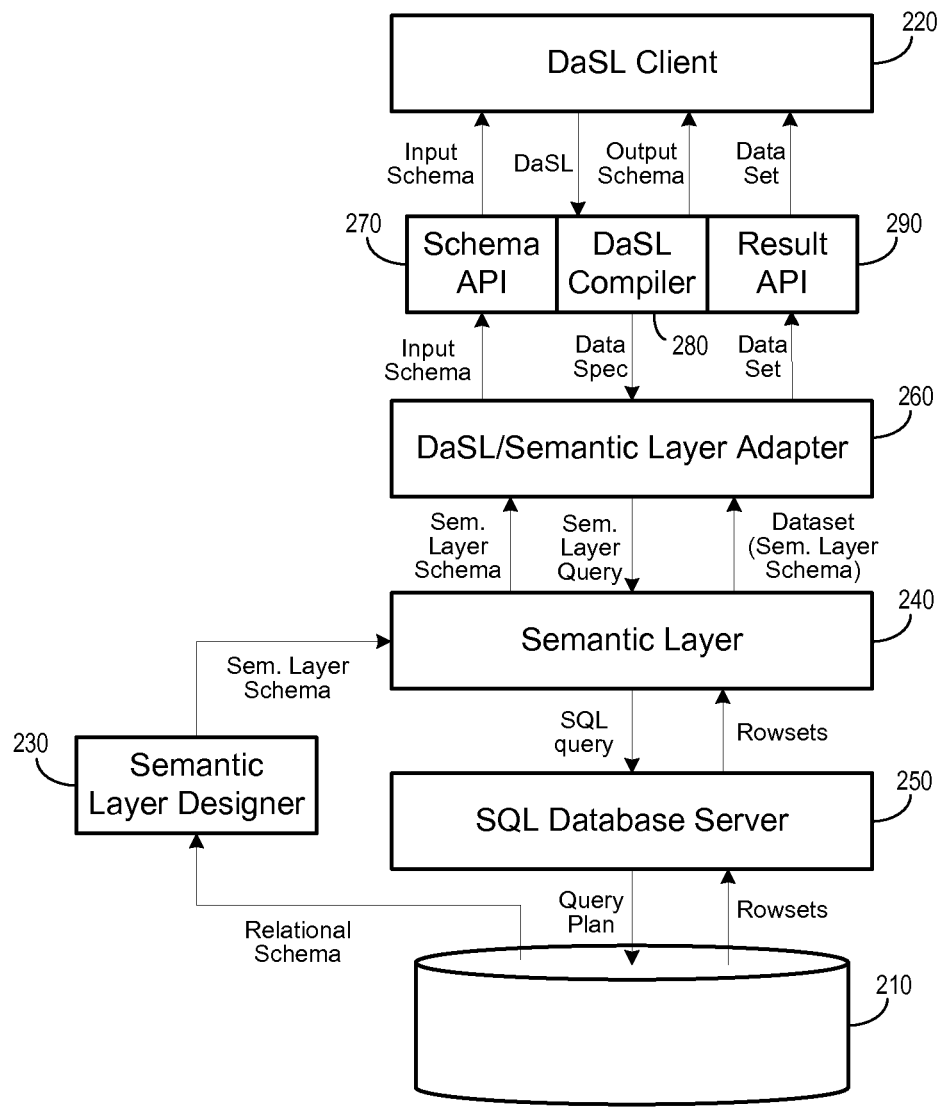
FIG. 2 is a block diagram of a system according to some embodiments.
Figure 3:
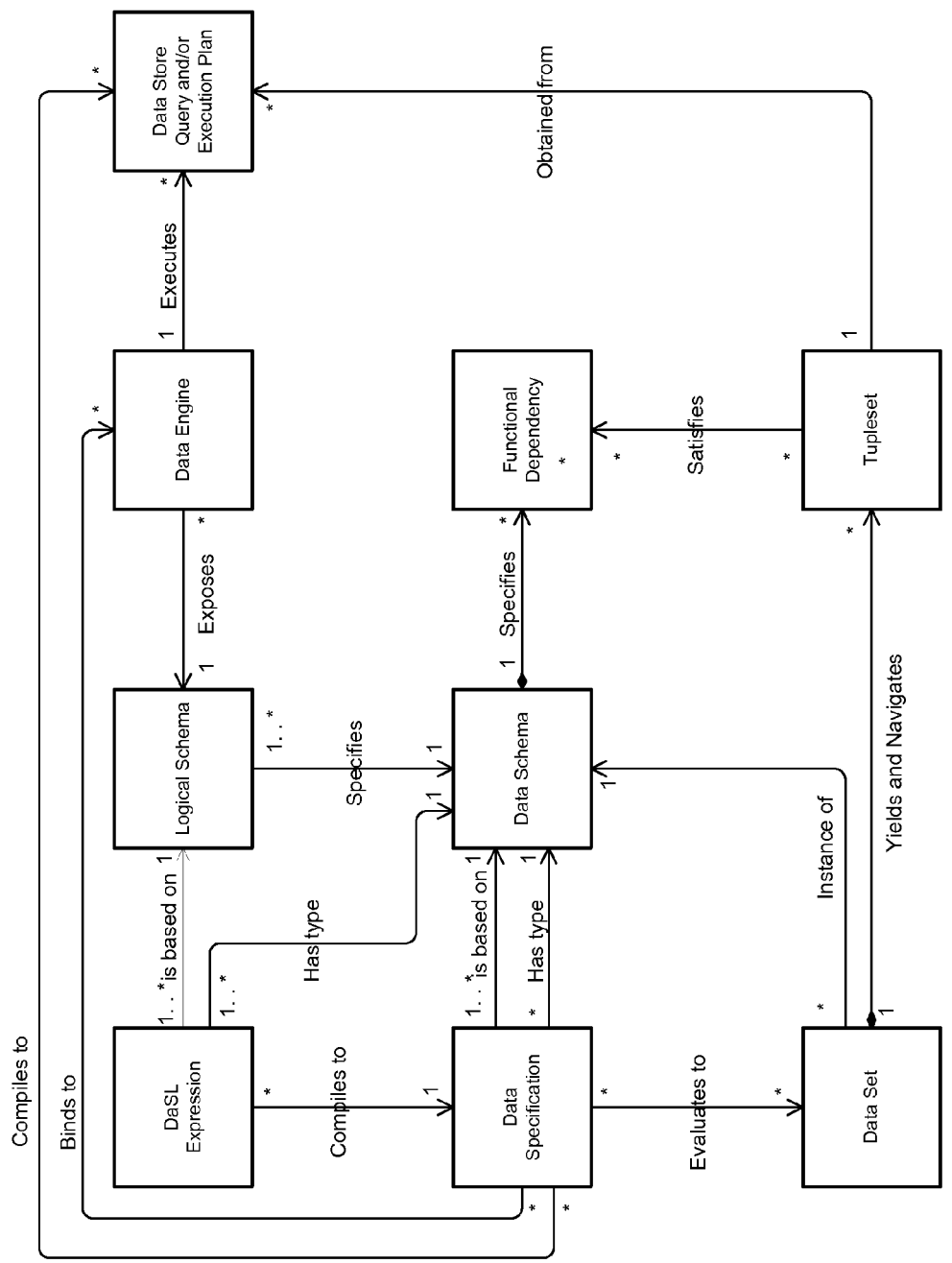
FIG. 3 is a Unified Modeling Language diagram according to some embodiments.

A brief description of DaSL according to some embodiments will now be provided as background, with reference to FIGS. 1-3.

FIG. 1 is a diagram of DaSL input schema 100 extracted from a Universe associated with a marketing database of an electronics company. The company sells electronics such as computers and mobile phones to customers located in cities all over the world. The Universe maps logical entities of the marketing database's schema to a set of business objects such as Customer, City, Product, Year and Revenue.

Generally, DaSL attributes of DaSL input schema 100 (represented by rectangles) correspond to notions of Measures and Dimensions, but do not map precisely to either notion. The DaSL language captures, for example, the aggregative property in the case of a Measure, and the notion of dependency is used in DaSL to capture associations between business entities.

The dependencies between the business terms are anonymous and represented as circles. Although not illustrated in FIG. 1, DaSL input schema 100 includes dependencies for typing (e.g., a dependency capturing that Revenue is Numeric). Additionally, and independent of the Universe, DaSL input schema 100 contains dependencies exposing calculation capabilities of the underlying data source, for example arithmetic operations like +, −, /, *. Moreover, large arrowheads denote set semantics (i.e., 0:N multiplicity) while small arrowheads denote scalar semantics (i.e., 0:1 multiplicity).

DaSL input schema 100 captures the fact that Address is a property/detail of Customer, by associating a unique Address value to each Customer value. City is a dimensional attribute of Customer because each Customer corresponds to one unique City.

Some attributes exhibit domains of values. This is represented by dependencies with only output attribute roles. For example, City exhibits a domain of values, which qualifies City as a dimension. Similarly, Country is a dimensional attribute of City.

Revenue is a measure (i.e., it has an aggregative role) because the attribute Revenue has a scalar output role for one dependency, the fact table, and this dependency has set-inputs on Customer, Product and Year. This means that Revenue depends on these dimensions. On the other hand, even if Price is, like Revenue, a numeric attribute, Price is only a detail of the Product dimension because there is no value domain for Price, and no aggregative aspect is present. Every Product (scalar input in dependency) has one Price (scalar output of the dependency), and it is meaningless to compute a single Price for several Products.

An input schema according to some embodiments is a set of attributes related by dependencies. An attribute is an arbitrary name that represents some business entity or value, such as Customer, Revenue, Order Line or Geography. An attribute can be associated to a set of values. A DaSL expression computes sets of values for some attributes, sometimes taking into account the values for some other attributes. A set of values for an attribute may be empty, may contain only one element, or may contain an arbitrary set of values. A scalar attribute is an attribute which has a set of values containing at most one element.

A dependency represents a relation or constraint that holds between the sets of values for the attributes that it relates. A DaSL expression combines the dependencies exposed by the input schema to determine the calculations that are performed on its attributes.

Each attribute involved in a dependency has a specific role in the dependency, and this role is described by an axis. An axis of a dependency refers to an attribute, and describes how the dependency influences and/or is influenced by sets of values for the attribute. More specifically, for a given dependency, an attribute can be an input, an output, or both. This property is called the axis orientation. An attribute can be a scalar or set input, and, independently, a scalar or set output of a dependency. This property is called the axis cardinality.

If a dependency includes a scalar output axis, then, if all its scalar input axes are connected to scalar attributes, the output attribute is also scalar. A dependency having a scalar output axis and no scalar input always has a scalar output attribute.

FIG. 2 is a block diagram of system 200 according to some embodiments. System 200 may operate to provide data from data store 210 to client 220.

As illustrated, semantic layer designer 230 determines the relational schema of data stored in data store 210. Semantic layer designer 230 maps logical entities of the relational schema to a set of abstract entities known as business objects. The business objects and their mappings comprise a semantic layer schema, which is defined in metadata of semantic layer 240.

Business objects may be classified as dimensions along which one may want to perform an analysis or report (e.g., Year, Country, Product), details (additional information on dimensions, e.g., Address of a Customer or Description of a Product), and measures (e.g., Sales, Profit) whose values can be determined for a given combination of dimension values.

Adapter 260 generates an input schema (such as schema 100) based on the semantic layer schema. Data Specification Language (DaSL) client 220 comprises a computing device executing a front-end software application providing reporting, planning and/or analytics. Client 220 receives the input schema via schema application programming interface (API) 270. Based on the input schema, client 220 creates a DaSL expression describing desired data of data store 210.

DaSL compiler 280 generates a data specification based on the DaSL expression and returns the data specification to adapter 260. DaSL compiler 280 also generates an output schema/data set topology based on the DaSL expression and returns the output schema to client 220. Notably, the generated data specification and the output schema are instances of the data schema according to some embodiments.

Adapter 260 generates zero, one, or more semantic layer queries based on the data specification and on known relationships between the input schema and the semantic layer schema. Semantic layer 240 receives the semantic layer query and creates zero, one, or more corresponding SQL queries based on the mappings which bind the semantic layer schema to the logical entities of the relational schema of data store 210. SQL database server 250 receives the SQL query and creates a query plan.

Data store 210 executes the query plan and returns rowsets (i.e., data) to SQL database server 250. Semantic layer 240 receives the rowsets therefrom, formats the included data based on the semantic layer schema, and provides the formatted dataset to adapter 260. Adapter 260 creates a data set which is also an instance of the data schema. DaSL client 220 invokes result API 290 to retrieve the data set, and then formats the data set based on the output schema previously received from DaSL compiler 280.

In contrast to system 200, conventional query languages require one set of expression statements to author a schema and a second set of expression statements to query on the schema. For instance, the Data Description Language of SQL is used to author an SQL database, and MDX Script is used to create an MDX Cube. Some embodiments of system 200 use the same language to define the input schema and to create a DaSL expression.

Embodiments are not limited to relational schemas as described in the example of system 200. The schema of the underlying data store could be relational, multi-dimensional or another type, and an input schema may be generated therefrom for use by an adapter, compiler and client as described above. In this regard, elements 230 through 250 provide adapter 260 with metadata binding the input schema to logical entities of the underlying logical schema of data store 210; these elements are not required if the bindings are otherwise available to adapter 260.

FIG. 3 illustrates logical relationships between several of the above-mentioned entities according to some embodiments. As described, a Data Engine of a data store executes a Query and/or Execution plan and also exposes a Logical Schema of the data store. The Logical Schema specifies an Input Schema. Moreover, a DaSL Expression is based on the Logical Schema and a type of the DaSL Expression is a DataSchema. The DaSL Expression compiles to a Data Specification, which is an instance of the Data Schema.

The Data Specification binds to the Data Engine and further compiles to zero, one or more Query and/or Execution plans. The Data Specification evaluates to a Data Set, which is an instance of the Data Schema. The Data Set also yields and navigates a Tupleset, which in turn satisfies a Functional Dependency specified by the Input Schema and is obtained from the Query and/or Execution Plan. With reference to FIG. 2, a semantic layer may be considered as the Logical Schema of FIG. 3, with the Data Engine including elements 240 and 250 of system 200.

The Input Schema identifies what can be queried or computed using a DaSL expression and is expressed in metadata. An input schema according to some embodiments may be mapped on top of an arbitrary data source, regardless of how the data source stores information or of the type of queries the data source can support.

As s mentioned above, personal objects are created using DaSL expressions according to some embodiments. The following is an example of a DaSL expression which selects a City by its name and creates one personal object (i.e., MyCity), which in this example is a custom dimension, and then displays the Revenue for the personal object.

WITH (MyCity AS City<-"Paris") Revenue FOR MyCity;

The general syntax is the following:

<Expression>: WITH (<DefExpr>)<MainExpression>
<DefExpr>: <PersonalObjectID>AS<Expression>

Figure 4:
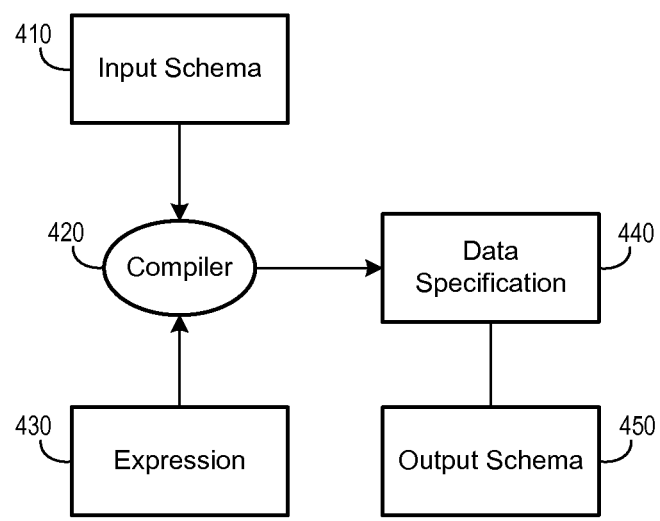
FIG. 4 illustrates compilation of an expression according to some embodiments.

DaSL expression compilation is depicted in FIG. 4. Based on input schema 410 (e.g., extracted from a Universe) and DaSL expression 420, DaSL compiler 430 creates data specification 440, whose type is output schema 450. Both input schema 410 and output schema 450 contain a set of dependencies.

Figure 5:
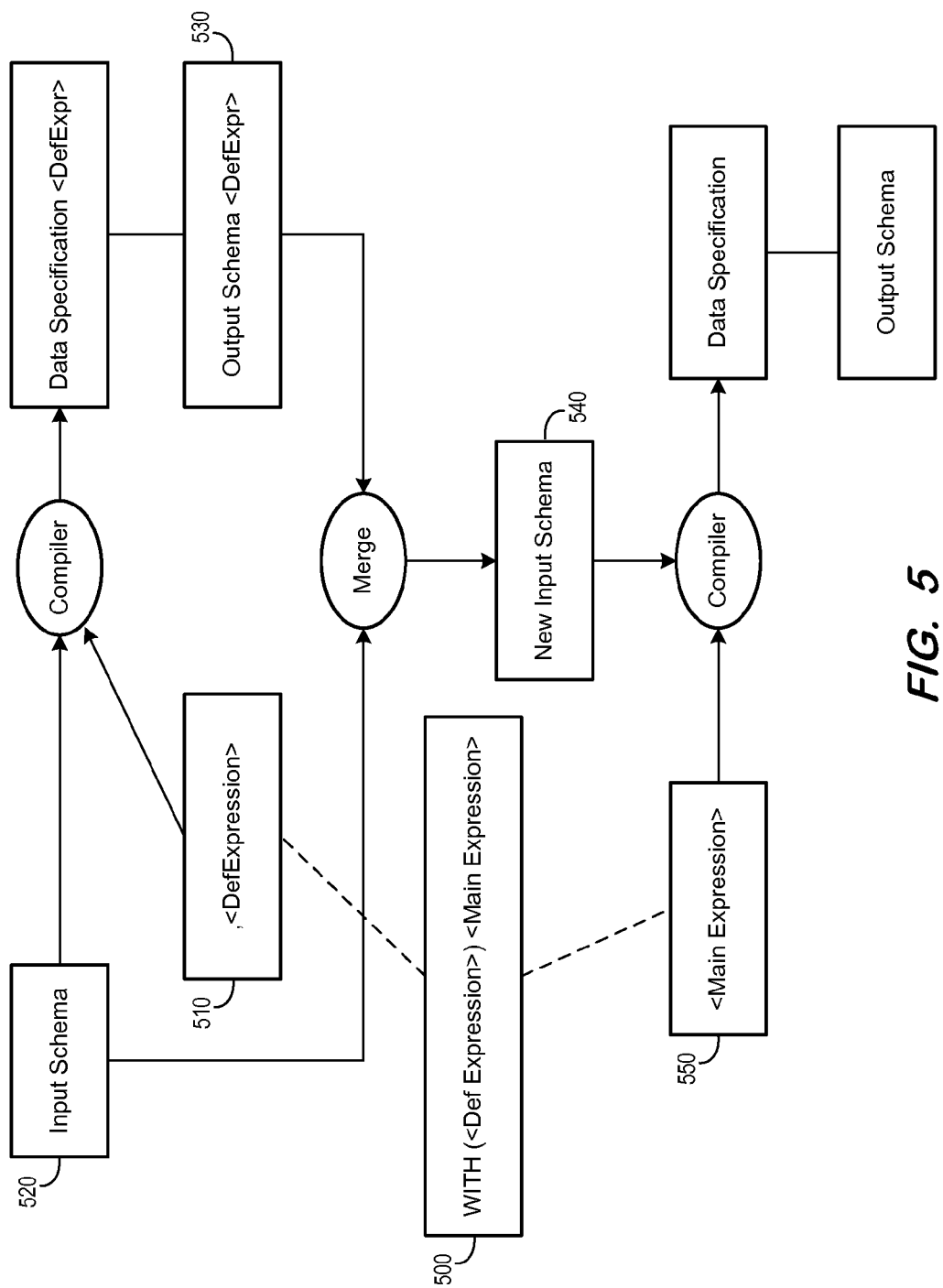
FIG. 5 illustrates compilation of an expression including a WITH operator according to some embodiments.

FIG. 5 depicts compilation of DaSL expression 500 conforming to the above syntax. As mentioned, DaSL expression 500 creates a personal object, and the top-level construct of the expression 500 is a WITH operator. The element <DefExpression> 510 of DaSL expression 500 is compiled first using input schema 520, which was extracted from a semantic layer. This compilation results in output schema 530 which contains a new attribute (i.e., the personal object), and a dependency that outputs it. Output schema 530 is merged with input schema 520 to generate new input schema 540. The merge of schemas 520 and 530 consists of constructing a new set of dependencies as the union of their two sets of dependencies.

According to some embodiments, the merge of two schemas is a DaSL operation that consists in building a new schema, referred to herein as the "Merge Schema". Dependencies that output the same attribute from different schemas are "merged" into one dependency that is added to the Merge Schema. The set of attributes of the Merge Schema is the union of the sets of attributes of the schemas that are merged. If an attribute is output only by dependencies in one schema, these dependencies are added to the Merge Schema.

In the present case, a Personal Object is a new attribute which does not exist in the Input Schema, so there is no dependency that outputs the Personal Object in the Input Schema. Accordingly, as described in the paragraph above, the new input schema is a union of the dependencies of the original input schema (520) and the dependencies of output schema (530), i.e., the dependency which outputs the Personal Object. The newly created attribute (i.e., for the Personal Object) is also added to the new input schema.

New input schema 540 is used to compile <MainExpression> 550, which is the part of expression 500 outside the personal object definition. Therefore, compilation of <MainExpression> 550 proceeds as described with respect to FIG. 4, in which new input schema 540 serves as input schema 410 and <MainExpression> 550 serves as expression 430.

The identifier of the personal object (i.e., PersonalObjectID) does not exist in input schema 520 extracted from the semantic layer. <MainExpression> in the DaSL syntax above might contain WITH sub-expressions, so these operators can be nested, and personal objects can therefore be defined in terms of other personal objects. The compilation can take place in two distinct phases. In the first phase, the definitions are compiled and result in the creation of a new input schema. In the second phase, this input schema can be shared for the compilation of potentially several DaSL expressions. The input schema extracted from the semantic layer (e.g., input schema 520) is therefore enriched with new (personal) objects.

Some embodiments therefore extend the semantic layer with personal objects (POs) and support DaSL queries which mix objects originated in the semantic layer with personal objects. The new personal objects may be based on objects of the semantic layer, or on other previously-created personal objects.

Figure 6:
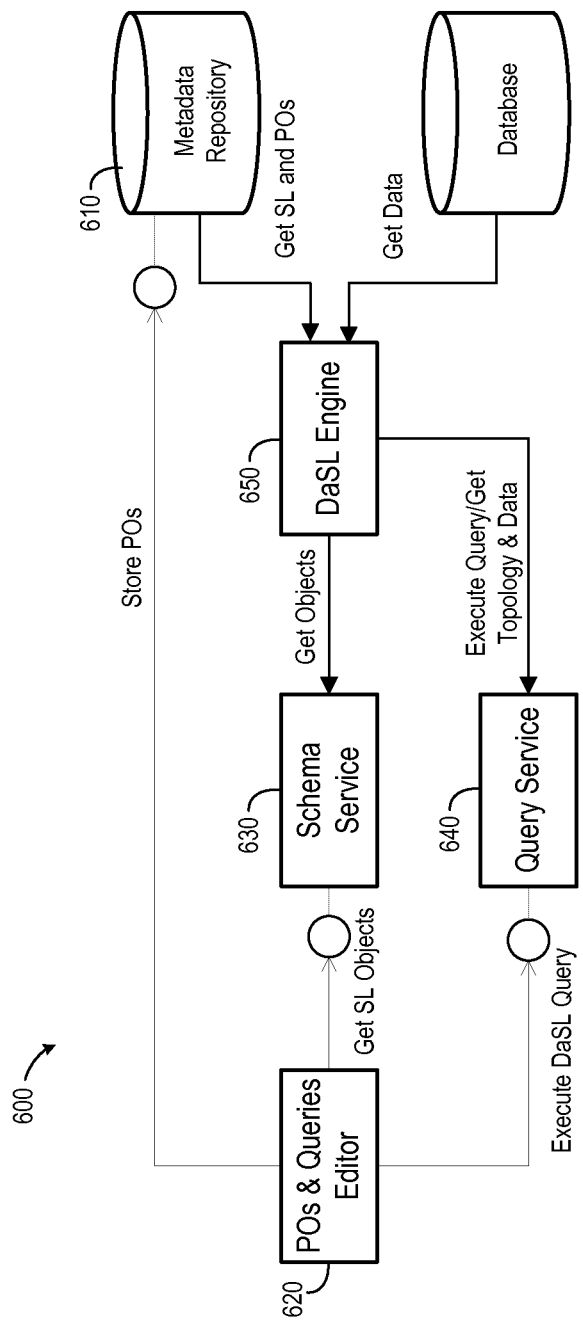
FIG. 6 is a diagram of an architecture to support personal objects according to some embodiments.

The definition of POs, as well as their relations, are persisted in order to be used in DaSL queries. FIG. 6 presents the general architecture of system 600 implementing this persistence and the runtime use of personal objects.

Metadata repository 610 persists PO metadata in a graph database. The POs may be created in editor 620, which uses a persistency service provided by the graph database, schema service 630 and query service 640.

Schema service 630 provides a list including the available objects, each of which is either a Dimension or a Measure. The list is created by DaSL Engine 650 after analyzing the metadata of metadata repository 610 which describes the data source (e.g. Universe) and any existing personal objects.

Editor 620 defines a new PO using a DaSL expression that references objects in the list. The editor analyses the syntax of the expression, and registers, in the graph of repository 610, the expression, its dependency on the Semantic Layer, and any relations of the newly-created PO with other POs. The syntax is checked using an instance of the DaSL Compiler embedded in editor 620 on the client side.

Figure 7:
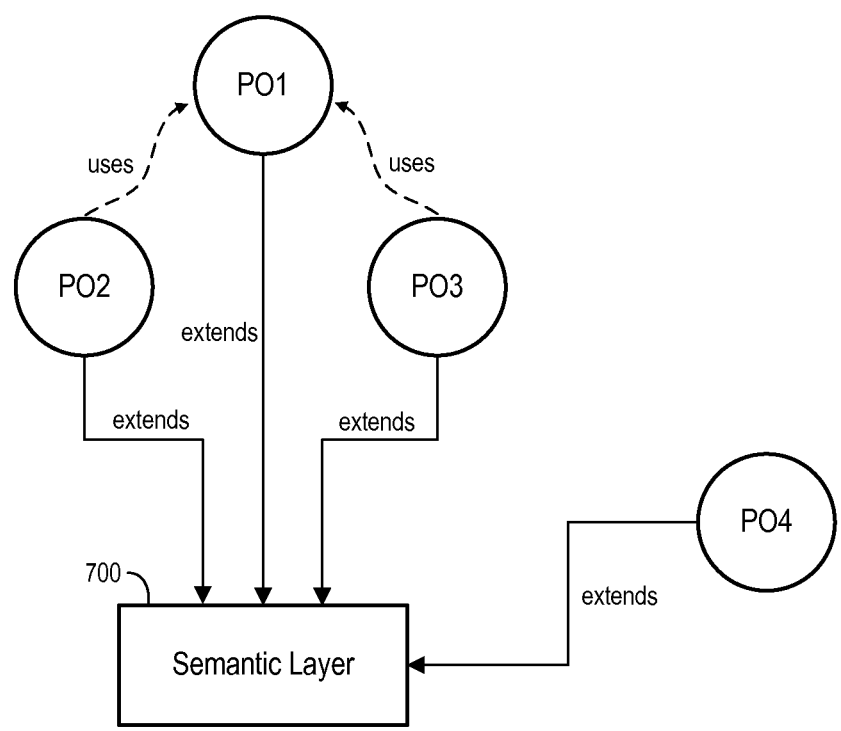
FIG. 7 illustrates relations between personal objects and a semantic layer according to some embodiments.

FIG. 7 illustrates relations between various personal objects and semantic layer 700. According to this example, the creation of PO2 consists of analyzing the DaSL expression defining PO2:<dasl expression(PO1)>, and observing that the PO1 identifier is used to define PO2. A complete definition for PO2 is then derived by adding the definitions of the referenced POs:
WITH (PO1 AS<dasl expression>)
<dasl expression(PO1)>;

If PO1 uses other POs, the complete list of needed POs is derived and the WITH clauses are added in proper order, using a topological sort that takes into account the dependencies between the POs. The query is validated by asking query service 640 to execute it. Next, it is determined whether the PO is to be considered a dimension or a measure. This determination is discussed in detail below with respect to FIGS. 9-11.

If the query validation succeeds, the PO2 entity is created in the graph with the following attributes: name, definition and nature (i.e., dimension or measure). The system creates an "extends" relation between PO2 and semantic layer 700, as well as a "uses" relation between PO2 and PO1.

The POs are not only used in design time, but also at runtime. At runtime, they may be loaded in the same time as the semantic layer and are incorporated in the DaSL input schema as DaSL attributes. They can then be used the same way as any other object of the semantic layer.

Figure 8:
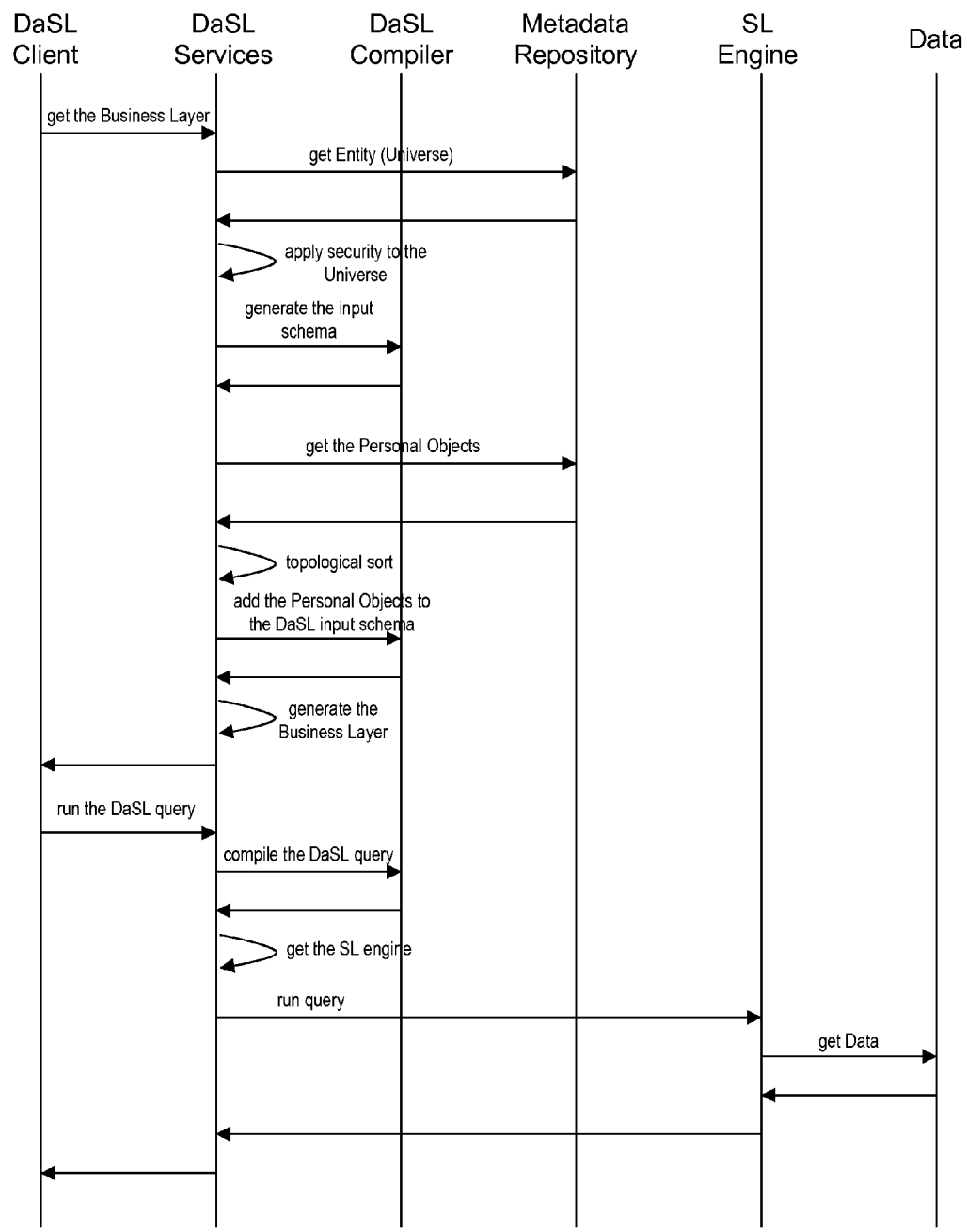
FIG. 8 is a sequence diagram according to some embodiments.

FIG. 8 is a sequence diagram for execution of a DaSL query at runtime according to some embodiments. As illustrated, a DaSL client (e.g., DaSL client 220) requests objects of a semantic layer (e.g., a Universe) from a metadata repository (e.g., metadata repository 610, semantic layer 240). DaSL services (e.g., schema service 630, schema API 270) perform preparatory actions, such as those described below. A DaSL compiler (e.g., DaSL engine 650, DaSL compiler 280/adapter 260) creates a DaSL input schema based on the semantic layer.

Next, DaSL services (e.g., schema service 630, schema API 270) retrieve a list of personal objects from the metadata repository. The listed personal objects are those which are persisted in the metadata repository and which have relations of type "extends" with the current semantic layer. The personal objects are sorted topologically according to the relations between them. The sorted personal objects are added one-by-one, according to the sorted order, to the DaSL input schema as described with respect to FIG. 5. The result is a new DaSL input schema (e.g., new input schema 540 of FIG. 5) which is returned to the DaSL client.

The DaSL client creates a DaSL query based on the new input schema (i.e., Business Layer), and the DaSL services use the new input schema to compile the DaSL query as described with respect to FIG. 4. The compiled query is then run against the semantic layer to retrieve corresponding business data as is known in the art.

If metadata of a personal object is modified or deleted, all related personal objects are re-validated as described with respect to FIG. 7. Accordingly, DaSL clients which use personal objects in persisted queries should be capable of personal object validation.

When an input schema is extracted from a Universe, a DaSL attribute is associated with each business object of the Universe. It can be determined whether a DaSL attribute corresponds to a measure or to a dimension by inspecting the associated business object. In order to determine whether a DaSL attribute associated with a personal object corresponds to a measure or a dimension, it is determined whether the personal object should be classified as a measure or a dimension.

Generally, a personal object might be classified as a measure if either of the following are true: 1) the personal object is a formula that involves one (or several) measure(s); and 2) the personal object can be aggregated on at least one dimension.

Figure 9:
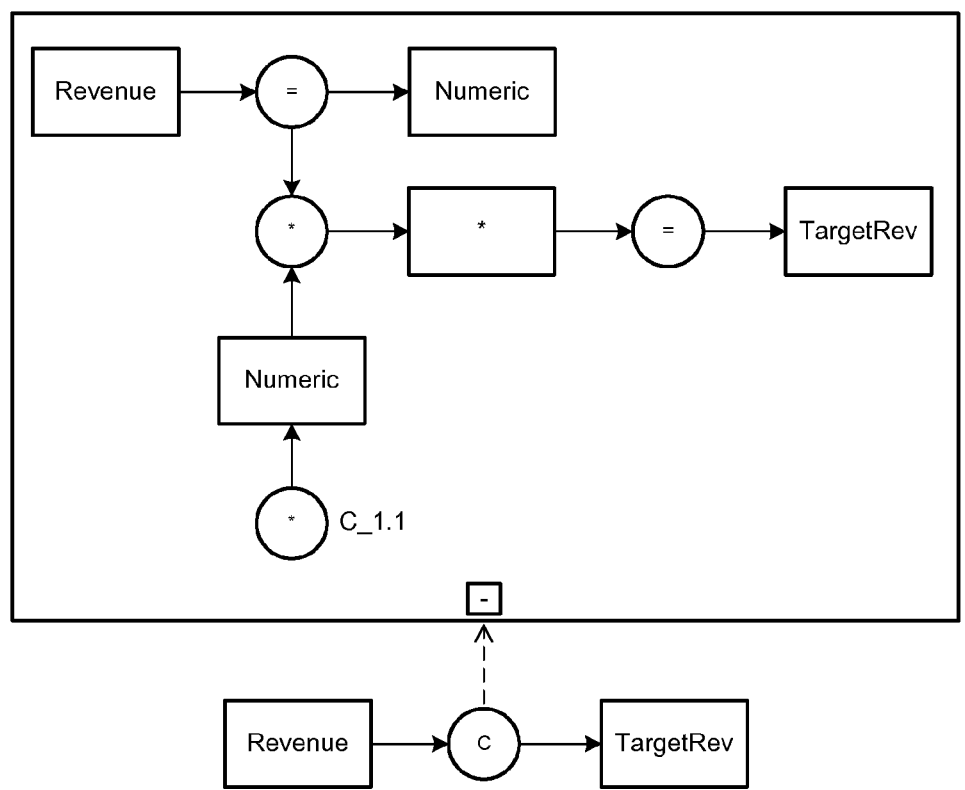
FIG. 9 is a diagram illustrating the definition of a measure having scalar inputs according to some embodiments.

This DaSL expression "WITH (TargetRevenue AS Revenue*1.1) TargetRevenue PER City" projects a target increase of 10% of (all) Revenue(s), and the target revenues are listed per city. As depicted in FIG. 9, TargetRev exhibits one dependency which has the Revenue attribute as a scalar input. TargetRev can be used in any context where Revenue can be used. This dependency is a collection of a data specification which involves "typing" dependencies labeled by "=", e.g., Revenue is a Numeric, a constant "1.1", and the dependency that stands for the arithmetic operation of multiplication.

Figure 10:
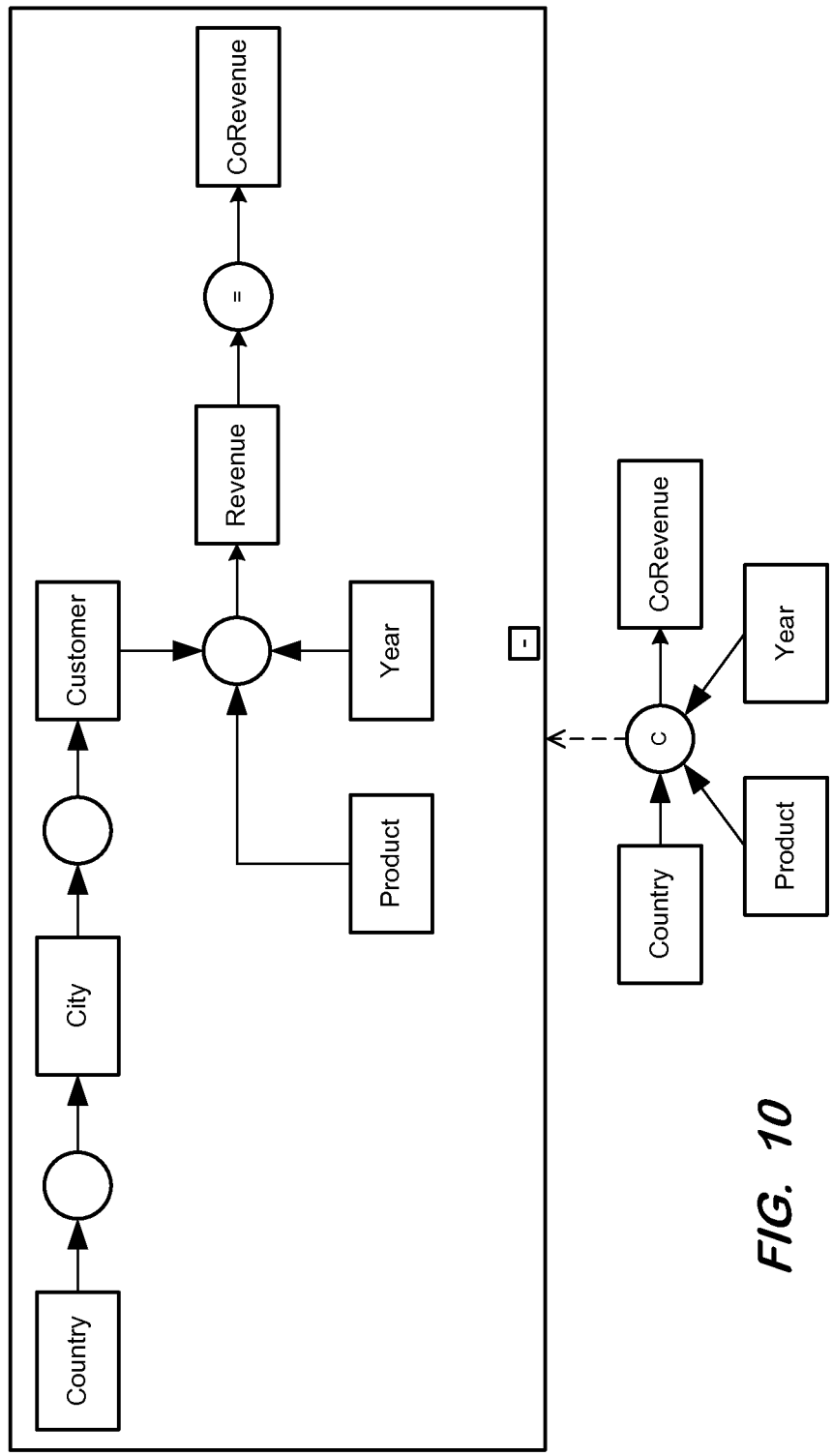
FIG. 10 is a diagram illustrating the definition of a measure having set inputs according to some embodiments.

FIG. 10 illustrates an example "WITH (CoRev AS Country.Revenue) CountryRev PER City". The definition depicted in FIG. 10 is again a collection of a data specification which combines several dependencies, including dependencies which allow navigation from Country to City and from City to Customer, the fact table that provides Revenue, and a dependency that renames Revenue in CoRevenue.

The definition aggregates Revenues per Country in a new attribute CoRevenue. The iteration associates to each City the Revenue value for its whole Country. The dimensionality of CoRevenue is the almost the same as the one of Revenue, except for the City dimension that is replaced by Country, so the aggregation is more coarse-grained.

Figure 11:
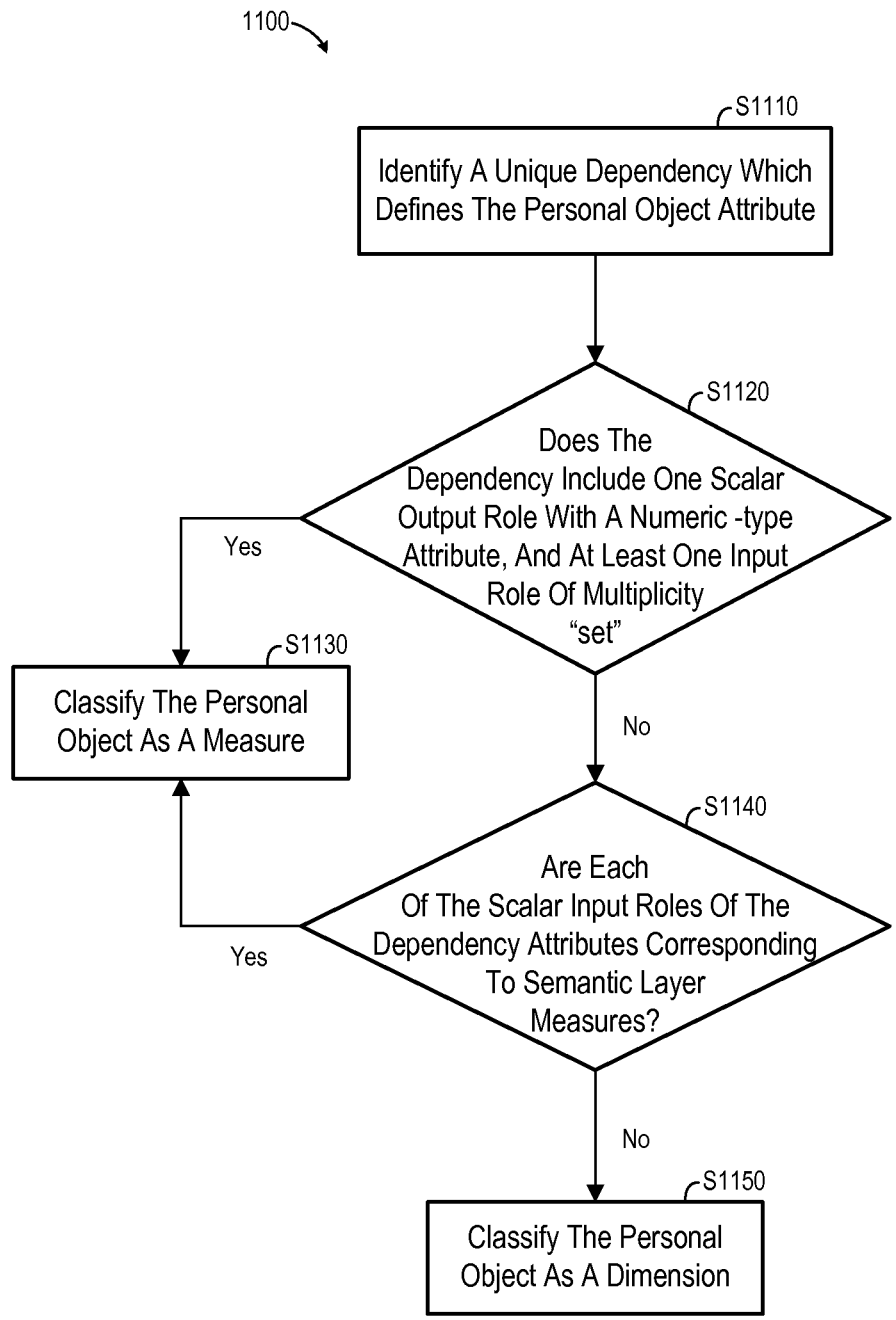
FIG. 11 is a flow diagram of a process to classify a personal object according to some embodiments.

FIG. 11 is a flow diagram of a process 1100 to classify a personal object as a measure or a dimension according to some embodiments. Initially, at S1110, an input schema is analyzed to identify a unique dependency which defines (i.e., outputs) the attribute of the personal object.

Next, at S1120, it is determined whether the dependency has one scalar output role with an attribute of Numeric type, and at least one input role of multiplicity set. The set requirement for at least one input attribute is a determination of the aggregative behavior mentioned above. If the determination is positive, the personal object is classified as a measure at S1130.

Otherwise, flow proceeds to S1140. At S1140, it is determined whether each of the scalar input roles of the dependency are attributes which correspond to measures of the associated semantic layer. If so, flow again proceeds to S1130 to classify the personal object as a measure. If the determination at S1140 is negative, the personal object is classified as a dimension at S1150.

Figure 12:
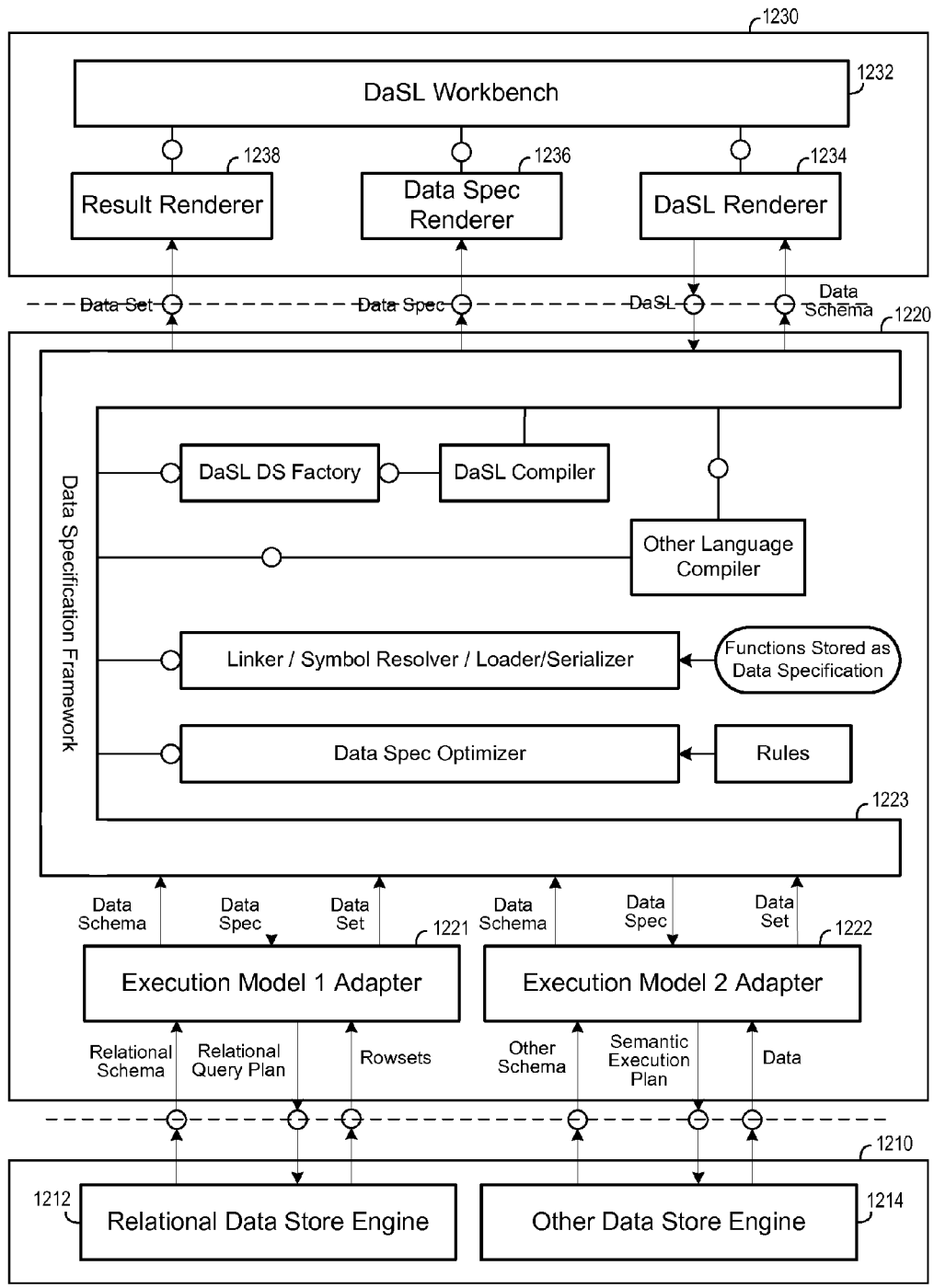
FIG. 12 is a block diagram of a system according to some embodiments.

FIG. 12 provides a detailed block diagram of an implementation of system 200 and/or system 600 according to some embodiments. System 1200 provides data of two different data stores 1210, neither of which is limited to an SQL implementation.

Execution model 1 adapter 1221 of application server 1220 may implement the functionality ascribed above to SQL database server 250, semantic layer 240 and adapter 260, although not limited to the SQL language. As such, adapter 1221 may generate a Data Schema based on a relational schema of relational data store engine 1212 and may generate a relational query plan based on a data specification received from data specification framework 1223. Moreover, adapter 1221 receives rowsets from relational data store engine 1212 in response to such a relational query plan and provides a data set, which is an instance of the Data Schema, to data specification framework 1223.

Execution model 2 adapter 1222 operates similarly to adapter 1221 but with respect to other data store engine 1214. Other data store engine 1214 may conform to any type of schema or execution engine. Adapter 1222 may generate a second Data Schema based on this schema and may generate a semantic execution plan based on a second data specification received from data specification framework 1223. The second Data Schema differs from the Data Schema generated by adapter 1221, and the second data specification is an instance of the second Data Schema. Adapter 1222 receives data from other data store engine 1214 in response to a semantic execution plan and provides a corresponding data set, which is also an instance of the second Data Schema, to data specification framework 1223.

Data specification framework 1223 compiles DaSL expressions received from front-end 1230 to data specifications based on a particular Data Schema, as well as other optimization tasks. Embodiments are not limited to DaSL expressions as described herein. Accordingly, data specification framework 1223 also compiles queries expressed in other languages to data specifications based on a particular Data Schema.

DaSL workbench 1232 of front-end 1230 may utilize DaSL renderer 1234 to receive a generate DaSL expression and generate a Data Schema and based thereon. In this regard, a type of the DaSL expression is itself a Data Schema. Data spec renderer 1236 receives data specifications compiled based on these Data Schemas and operates in conjunction with result renderer 1238 to render a received data set based on a corresponding compiled data specification.

Figure 13:
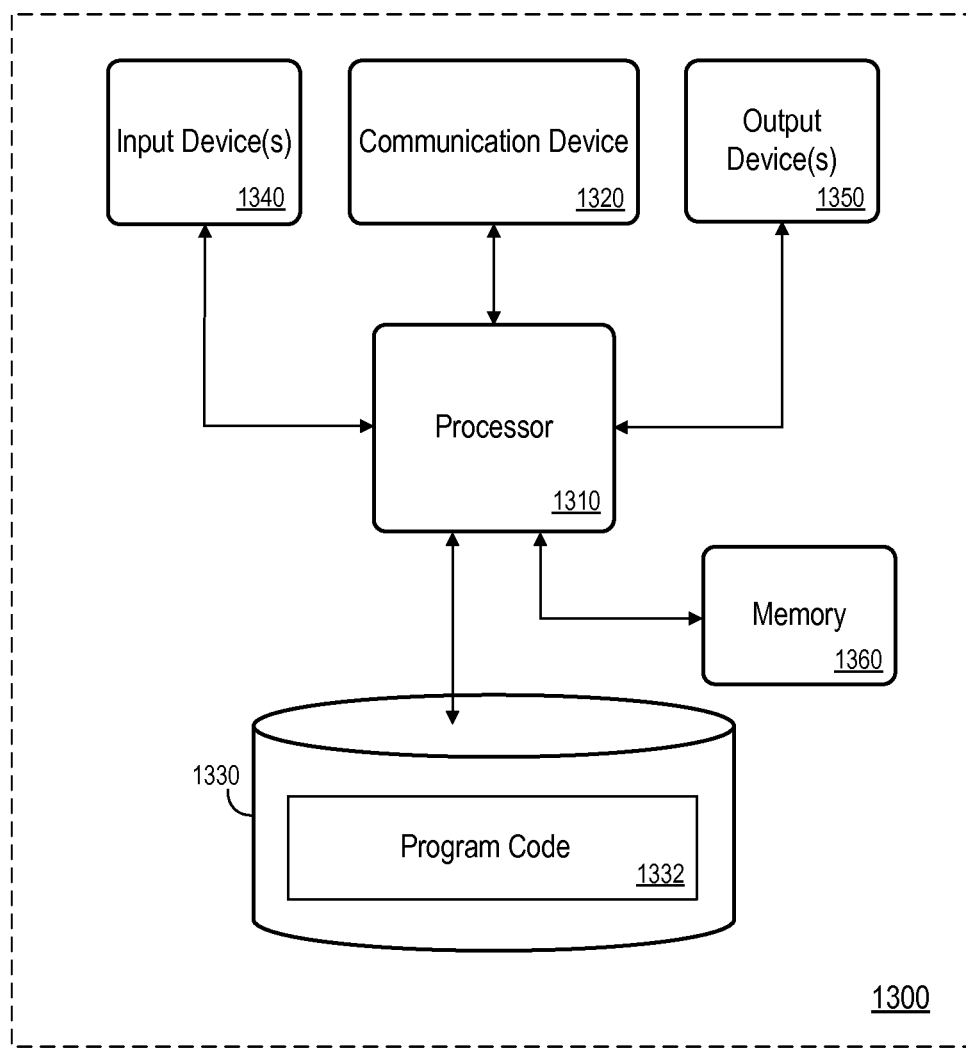
FIG. 13 is a block diagram of an apparatus according to some embodiments.

FIG. 13 is a block diagram of apparatus 1300 according to some embodiments. Apparatus 1300 may comprise a general-purpose computing apparatus and may execute program code to perform any of the functions described herein. Apparatus 1300 may comprise an implementation of application server 1220. Apparatus 1300 may include other unshown elements according to some embodiments.

Apparatus 1300 includes processor 1310 operatively coupled to communication device 1320, data storage device 1330, one or more input devices 1340, one or more output devices 1350 and memory 1360. Communication device 1320 may facilitate communication with external devices, such as a reporting client, or a data storage device. Input device(s) 1340 may comprise, for example, a keyboard, a keypad, a mouse or other pointing device, a microphone, knob or a switch, an infra-red (IR) port, a docking station, and/or a touch screen. Input device(s) 1340 may be used, for example, to enter information into apparatus 1300. Output device(s) 1350 may comprise, for example, a display (e.g., a display screen) a speaker, and/or a printer.

Data storage device 1330 may comprise any appropriate persistent storage device, including combinations of magnetic storage devices (e.g., magnetic tape, hard disk drives and flash memory), optical storage devices, Read Only Memory (ROM) devices, etc., while memory 1360 may comprise Random Access Memory (RAM).

Program code 1332 may be executed by processor 1310 to cause apparatus 1300 to perform any one or more of the processes described herein. Embodiments are not limited to execution of these processes by a single apparatus. Data storage device 1330 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the discussed architectures may include a processor to execute program code such that the computing device operates as described herein.

All systems and processes discussed herein may be embodied in program code stored on one or more non-transitory tangible computer-readable media. Such media may include, for example, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A non-transitory computer-readable medium storing program code, the program code executable by a processor of a computing system to cause the computing system to:
   receive a logical schema associated with data stored in a data store;
   generate an input schema based on the logical schema;
   receive an expression having a type of the input schema and comprising a first expression element and a second expression element outside of the first expression element, the first expression defining an object;
   compile the first expression element based on the input schema to generate an output schema;
   merge the output schema and the input schema to generate a second input schema;
   compile the second expression element based on the second input schema to generate a second output schema; and
   wherein the expression conforms to:
   WITH (<PersonalObjectID> AS <Expression>)<MainExpression>,
   where <PersonalObjectID> AS <Expression> is the first expression element and <MainExpression> is the second expression element.

2. The non-transitory computer-readable medium according to claim 1, wherein the object is not a member of the logical schema.

3. The non-transitory computer-readable medium according to claim 1, wherein the input schema is associated with a first set of dependencies, wherein the input schema does not include an attribute associated with the object, and wherein the output schema comprises an attribute associated with the object and a dependency which outputs the new attribute.

4. The non-transitory computer-readable medium according to claim 3, wherein the output schema is associated with a second set of dependencies and wherein merger of the output schema and the input schema comprises determination of a union of the first set of dependencies and the second set of dependencies.

5. A computer-implemented method comprising:
   receiving a logical schema associated with data stored in a data store;
   generating an input schema based on the logical schema;
   receiving an expression having a type of the input schema and comprising a first expression element and a second expression element outside of the first expression element, the first expression defining an object;
   compiling the first expression element based on the input schema to generate an output schema;
   merging the output schema and the input schema to generate a second input schema;
   compiling the second expression element based on the second input schema to generate a second output schema; and
   wherein the expression conforms to:
   WITH (<PersonalObjectID> AS <Expression>)<MainExpression>,
   where <PersonalObjectID> AS <Expression> is the first expression element and <MainExpression> is the second expression element.

6. The computer-implemented method according to claim 5, wherein the object is not a member of the logical schema.

7. The computer-implemented method according to claim 5, wherein the input schema is associated with a first set of dependencies, wherein the input schema does not include an attribute associated with the object, and wherein the output schema comprises an attribute associated with the object and a dependency which outputs the new attribute.

8. The computer-implemented method according to claim 7, wherein the output schema is associated with a second set of dependencies and wherein merger of the output schema and the input schema comprises determination of a union of the first set of dependencies and the second set of dependencies.

9. A system comprising:
   a data storage device storing data;
   a computing device comprising:
      a memory storing processor-executable program code; and
      a processor to execute the processor-executable program code in order to cause the computing device to:
   receive a logical schema associated with the data;
   generate an input schema based on the logical schema;
   receive an expression having a type of the input schema and comprising a first expression element and a second expression element outside of the first expression element, the first expression defining an object;

compile the first expression element based on the input schema to generate an output schema;

merge the output schema and the input schema to generate a second input schema;

compile the second expression element based on the second input schema to generate a second output schema; and wherein the expression conforms to:

WITH (<PersonalObjectID> AS <Expression>)<MainExpression>, where <PersonalObjectID> AS <Expression> is the first expression element and <MainExpression> is the second expression element.

10. The system according to claim 9, wherein the object is not a member of the logical schema.

11. The system according to claim 9, wherein the input schema is associated with a first set of dependencies, wherein the input schema does not include an attribute associated with the object, and wherein the output schema comprises an attribute associated with the object and a dependency which outputs the new attribute.

12. The system according to claim 11, wherein the output schema is associated with a second set of dependencies and wherein merger of the output schema and the input schema comprises determination of a union of the first set of dependencies and the second set of dependencies.

* * * * *